US009353679B2

(12) United States Patent
Hruschka (10) Patent No.: US 9,353,679 B2
(45) Date of Patent: May 31, 2016

(54) INTERNAL COMBUSTION ENGINE (71) Applicants: Peter K. A. Hruschka, Erlensee (DE); Johann Rudolf Nitz, Zizers (CH)

(72) Inventor: Peter K. A. Hruschka, Erlensee (DE)

(73) Assignees: Peter K.A. Hruschka, Erlensee (DE); Johann Rudolf Nitz, Zizers (CH)

( * ) Notice: Subject to any disclaimer, the term of this patent is extended or adjusted under 35 U.S.C. 154(b) by 0 days.

(21) Appl. No.: 14/272,857

(22) Filed: May 8, 2014

(65) Prior Publication Data

US 2014/0238337 A1 Aug. 28, 2014

Related U.S. Application Data

(63) Continuation of application No. 12/518,700, filed as application No. PCT/EP2007/010548 on Dec. 5, 2007, now abandoned.

(30) Foreign Application Priority Data

Dec. 11, 2006 (CH) ..................................... 2004/06

(51) Int. Cl.
*F02B 53/00* (2006.01)
*F01C 1/20* (2006.01)
*F01C 11/00* (2006.01)
*F01C 17/02* (2006.01)

(52) U.S. Cl.
CPC . *F02B 53/00* (2013.01); *F01C 1/20* (2013.01); *F01C 11/004* (2013.01); *F01C 17/02* (2013.01)

(58) Field of Classification Search
CPC ............ F01C 17/02; F01C 1/22; F01C 1/063; F02B 53/00; F02B 55/14
USPC .......... 123/246, 204, 232, 238, 239; 418/191, 418/196
See application file for complete search history.

(56) References Cited

U.S. PATENT DOCUMENTS

| 686,394 | A | 11/1901 | Deiwiks |
| 789,921 | A | 5/1905 | Langford |
| 904,974 | A | 11/1908 | Lee |
| 1,003,263 | A | 9/1911 | Humphreys |
| 1,046,280 | A | 12/1912 | Diefenderfer |

(Continued)

FOREIGN PATENT DOCUMENTS

| DE | 3543944 | 6/1987 |
| DE | 3627962 A1 | 3/1988 |

(Continued)

*Primary Examiner* — Patrick Maines
(74) *Attorney, Agent, or Firm* — Rankin, Hill & Clark LLP (57) ABSTRACT

The internal combustion engine includes at least one compression chamber, formed by a housing and therein compressor rotary pistons rotating on a shaft with compressor sealing strips, on which optionally movable toggle sealing strips are arranged. The compression chamber is in gas connection with at least one ignition chamber and this ignition chamber is in gas connection with at least one expansion chamber. This chamber is formed by the housing and by an expansion rotary piston rotating in this chamber on a shaft. An at least one flywheel rotating in the housing on a shaft provided for the power transfer together with the compressor rotary piston forms a compression chamber and together with the expansion rotary piston forms an expansion chamber. The ignition chamber is equipped with a device for igniting a compressed gas mixture.

6 Claims, 10 Drawing Sheets

(56) References Cited

U.S. PATENT DOCUMENTS

| | | | |
|---|---|---|---|
| 1,098,256 A * | 5/1914 | Harper | 418/122 |
| 1,226,745 A | 5/1917 | Brooks | |
| 2,373,304 A | 4/1945 | Garbeth | |
| 2,766,737 A | 10/1956 | Sprinzing | |
| 2,869,522 A * | 1/1959 | Marean | 123/232 |
| 3,364,906 A | 1/1968 | Huerta | |
| 3,381,670 A | 5/1968 | Kincaid | |
| 3,435,808 A | 4/1969 | Allender | |
| 3,550,565 A * | 12/1970 | Sanchez | 123/238 |
| RE27,191 E | 10/1971 | Skrob | |
| 3,640,252 A * | 2/1972 | Spinnett | 123/232 |
| 3,791,352 A | 2/1974 | Takacs | |
| 3,797,237 A | 3/1974 | Kamiya | |
| 3,843,284 A * | 10/1974 | Spinnett | 418/191 |
| 3,861,362 A | 1/1975 | Kenyon | |
| 4,002,033 A | 1/1977 | Welch | |
| 4,007,715 A * | 2/1977 | Bonnell et al. | 123/239 |
| 4,170,978 A | 10/1979 | Eslami | |
| 4,512,302 A | 4/1985 | Bunce | |
| 4,909,208 A | 3/1990 | Krisztics | |
| 5,520,147 A | 5/1996 | Secord | |
| 5,605,124 A | 2/1997 | Morgan | |
| 5,755,197 A | 5/1998 | Oplt | |
| 6,129,067 A * | 10/2000 | Riley | 123/246 |
| 6,401,686 B1 | 6/2002 | Prueitt | |
| 7,721,687 B1 | 5/2010 | Lockshaw | |
| 2004/0187803 A1 * | 9/2004 | Regev | 123/18 A |

FOREIGN PATENT DOCUMENTS

| | | | |
|---|---|---|---|
| DE | 3714639 | 11/1988 | |
| DE | 3714639 A1 * | 11/1988 | F01C 1/20 |
| DE | 3825372 | 2/1990 | |
| DE | 3825372 A1 | 2/1990 | |
| DE | 3825372 A1 * | 2/1990 | F01C 1/02 |
| DE | 4330033 A1 | 2/1994 | |
| DE | 4325454 | 2/1995 | |
| JP | 6111402 | 1/1986 | |
| JP | 61011402 A * | 1/1986 | F01C 1/20 |
| WO | 91/02888 | 3/1991 | |
| WO | WO 9102888 A1 * | 3/1991 | F01C 1/20 |
| WO | 9409261 | 4/1994 | |
| WO | 00/70188 | 11/2000 | |

* cited by examiner

INTERNAL COMBUSTION ENGINE

BACKGROUND OF THE INVENTION

The invention is related to an internal combustion engine on the basis of "rotary pistons", resp., on the basis of disc-shaped components of a certain design rotating on an axis and functionally corresponding with one another for the compression and expansion of combustion gases.

In the case of engines of this type, the clean compression is the crucial point between the combustion and the expansion supplying power. Because rotary piston engines comprise significantly higher speeds of rotation than, for example, the Otto engines with piston-connecting rod-crankshaft, but have the same ignition sequence, resp., working cycles, and because the compression volume is much smaller than in the case of piston engines (by a factor of 10 to 20), these engines so-to-say are more delicate with respect to the course over time of the working steps, suction intake, compression, ignition and expansion.

The implementation of short to extremely short gas paths, i.e., short conduits between the working cycle units, is an important requirement. The compression has to take place in an extremely short time and practically free of losses, for which purpose a special design of the gas compressing unit, therefore of the compressor, is necessary. For the expansion, in case of short gas paths the arrangement and the design of the ignition chamber has to fulfil the requirement of the short time sequence and the arrangement of the elements for the working cycles, namely suction intake, compression, ignition and expansion, have to be adapted to these requirements.

An engine of this type in various embodiments is the object of the invention, the features of which are defined in the claims.

BRIEF SUMMARY OF THE INVENTION

One problem for the translation of these requirements is the complete deviation of the design from conventional rotary piston engines. For some embodiments there is no following of designs that are already present.

A first embodiment of the rotary piston engine in accordance with the invention includes two working rotary pistons, which operate with a common flywheel. The flywheel has different functions; it is an inertia buffer and energy store to the transmission path, it is also a sealing organ to the compression—and expansion chambers and it is a shut-off device in connection with the sealing of the working rotary pistons. These are the compressor rotary piston and the expansion rotary piston. The working rotary piston and the flywheel are positively synchronised through a gearing. This engine per revolution of the flywheel twice works-off the classical working cycles of the Otto engine, namely suction intake-compression-ignition-expansion.

A further embodiment is an engine in accordance with the invention, which in addition to the embodiment described above includes two further working rotary pistons (compressor rotary piston and expansion rotary piston), which operate with the same one flywheel. With this, the cycles of the working cycles, suction intake-compression-ignition-expansion, are doubled, i.e., the engine works four times the classical working cycles per revolution of the flywheel, resp., per revolution of the drive shaft to the transmission.

A further embodiment of the engine comprises a reduction of the number of working cycles per revolution, in that the working rotary pistons (compression and expansion) each operate with its own flywheel, wherein the equal high compression is necessary, however, because of the reduced number of working cycles per revolution of the drive shaft, this engine is capable of being brought to significantly higher speeds of rotation.

A further embodiment, a variant of the last mentioned engine, operates with an additional suction intake stage, formed by a working rotary piston and a flywheel for the pre-compression, in case of very high speeds of rotation.

In the following discussion, the principle of the new rotary piston engine in accordance with the invention is presented. Primarily discussed are the essential elements and their function. Some components are solely schematically represented, such as, e.g., the electric ignition device. Not represented are devices for the cooling (in principle a casing for the circulation of the cooling fluid), also not represented is the carburettor device, resp., the injection device (in principle a conventional device) and also not represented are any exhaust gas conduits to the extent that they do not immediately concern the engine activity.

BRIEF DESCRIPTION OF THE DRAWINGS

FIGS. 4A and 4B and 4C and 4D illustrate a first embodiment of the invention, a rotary piston engine with two working rotary pistons and a flywheel, as depicted in FIG. 1.

FIGS. 6A and 6B illustrate a second embodiment of the invention, a rotary piston engine in the housing with four working rotary pistons and one flywheel.

FIGS. 7A and 7B and 7C and 7D and 7E illustrate the second embodiment of the engine without housing. An isometric view is illustrated in FIG. 7A, FIG. 7B is a cut-out, FIG. 7C a side view, FIG. 7D a cross-section and FIG. 7E a detail from the cross-section.

FIGS. 8A and 8B and 8C and 8D and 8E and 8F and 8G illustrate the second embodiment of the engine in the housing.

FIGS. 9A and 9B and 9C and 9D and 9E and 9F and 9G and 9E illustrate the engine of the second embodiment in connection with the housing, in which the bores for the gas flow are arranged.

FIGS. 10A and 10B and 10C illustrate a third embodiment of the engine (without housing), in the case of which the working rotary pistons are located on a common axis/shaft. FIG. 10A illustrates a kind of exploded view and the FIGS. 10B and 10C each respectively a view from the front and from the back.

FIGS. 12A and 12B and 12C and 12D and 12E illustrate the third embodiment of the engine together with the housing.

DETAILED DESCRIPTION OF THE INVENTION

Figure 1:
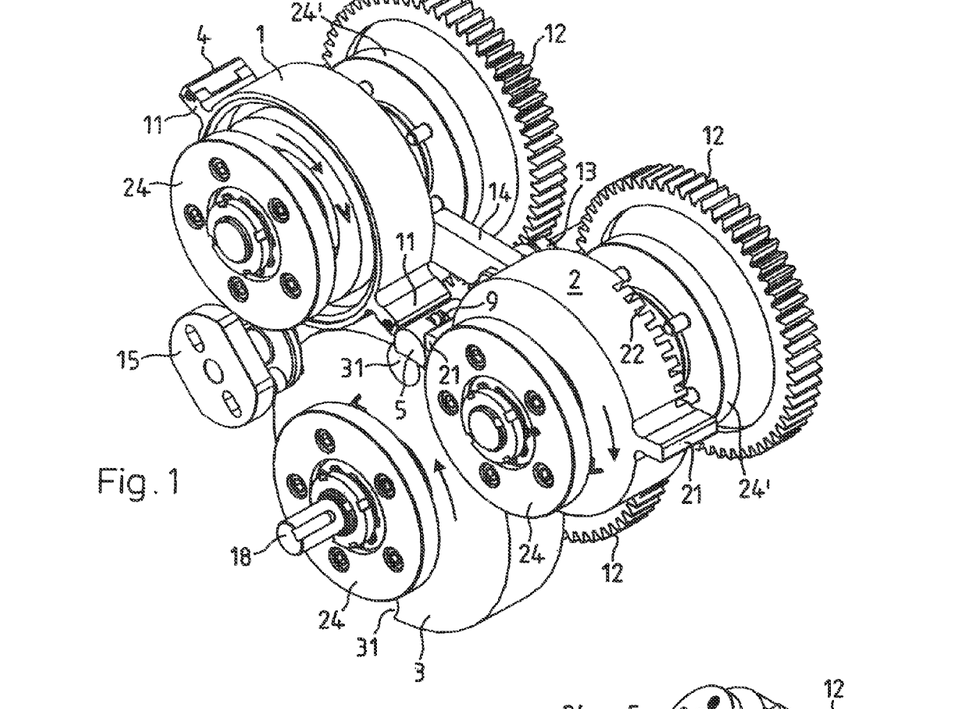
FIG. 1 for explaining the basic principle, illustrates a rotary piston engine with 3 axes/shafts in accordance with the invention without the housing covering the internal units.

FIG. 1 illustrates an embodiment of the invention in an arrangement with 3 axes, resp., shafts. The engine is depicted without the housing in order to show the details. The housing, however, is not simply an envelope, but rather a functional component of the engine with gas conduits and sealing functions as well as sections forming chambers, which remains to be illustrated in further Figures, resp., cross-sectional drawings with the housing. In comparison with FIG. 2A, the engine is slanted in such a manner, that one looks in from 'above'; in case of the FIG. 2A this is more from 'below', in order to show specific details respectively.

The engine, in essence, comprises three working components, a compressor rotary piston 1, an expansion rotary piston 2 and a flywheel 3 working together with both rotary pistons. The two working rotary pistons 1 and 2 opposite one another at 180 (angle) degrees each comprise two sealing strips 11 and 21. The flywheels opposite one another at 180 degrees comprise two correspondingly shaped recesses 31, in which during rotation the sealing strips are able to dip in and roll-off. Between the sealing strips and the (not depicted in this Figure) housing chambers are formed, which through the movement of the sealing strips in the direction of rotation are variably reducing in size for compression and increasing in size for the expansion. More about this further below.

Viewed form the 'front', the two working rotary pistons 1 and 2 rotate in clockwise direction, the flywheel 3 rotates counter-clockwise. This is indicated with arrows. The position of the sealing strips 11 and 21 facing one another in FIG. 1 show the approximate end of the compression of the compressor rotary piston 1 shortly before the ignition and the immediately starting expansion of the expansion rotary piston 2 after the ignition in the ignition chamber 7, which latter by means of inlets and passages in the housing is connected with the chambers for compression and expansion. In the 'rear' part of the Figure one is able to see the gearing 12 for the positive synchronisation of the rotary pistons and the flywheel. When the engine is running, the power is taken over by the shaft 18 on the flywheel 3. Depicted furthermore is a flange 15, on which the fuel supply (resp., the carburettor) is mounted. The flange 15 for the carburettor and the flanges 24 for the working elements are attached to a base plate 10' not depicted in this Figure, it forms a part of the housing. The counter-flanges 24' for supporting the shafts are attached to the housing 10. The centre bore in the flange 15 for the carburettor leads directly to the compression chamber, which because of the not depicted housing, is not able to be shown in this Figure. This as far as the general working principle is concerned. With the number 14, a cover of the ignition chamber formed in the housing is indicated, which simultaneously serves as a seat for the here just visible ignition plug 13. One furthermore on the sealing strips 11 of the compression part identifies so-called toggle sealing strips 4 and between the working rotary pistons 1 and 2 a so-called pendulum seal 5 with a receptacle 9 for a press-on device.

Figures 2A, 2B:
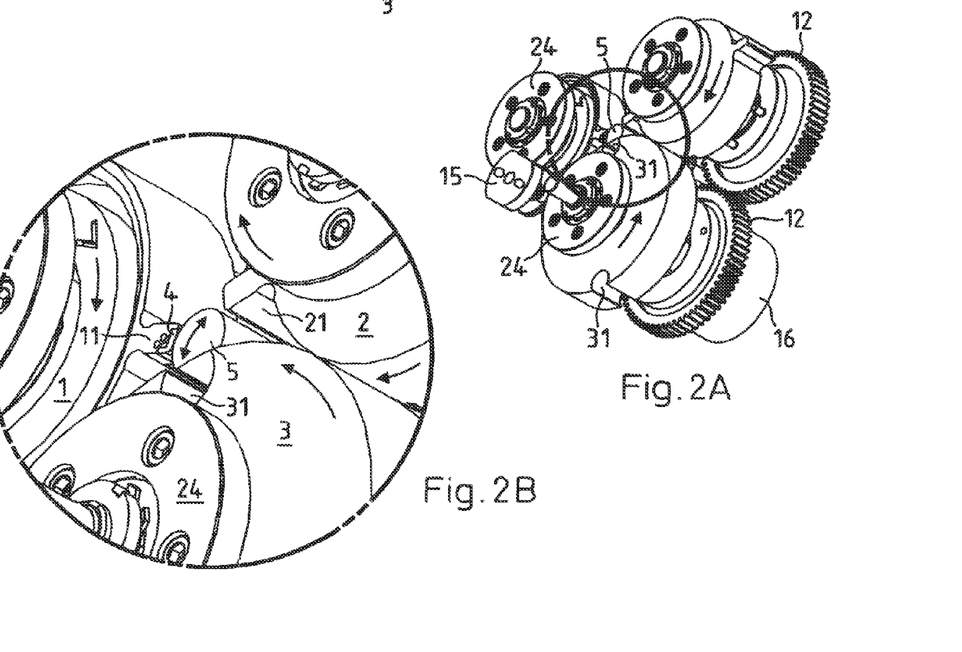
FIGS. 2A and 2B and 2C and 2D illustrate first details, the position of the seals, and gas transfer points on the compressor strip.

FIG. 2A illustrates the same engine slightly slanted to the rear, this in order to discuss a few details, which are depicted in enlarged form within the indicated circle, which represents FIG. 2B. Now visible by the slanting of the engine is a schematically indicated electric ignition device 16 on the gearing side, with which the ignition plug is electrically connected. The pendulum seal 5 is now visible inclined from below.

The details in FIG. 2B are the following: In order to achieve an extremely good seal between the housing and the compressor rotary piston 1 rotating at high speed and also between the transition of the interaction of dipping-in and rolling-off sealing strips 11, resp., 21 in one of the two recesses 31 of the flywheel 3, two essential measures are provided. On the sealing strips 11 of the compressor, rotary piston 1 toggle sealing strips 4 are arranged as capable of swivelling around a longitudinal axis and in the not depicted housing part, the pendulum seal 5 also arranged as movable between the housing and the flywheel 3, as easily swinging to and fro, indicated by a double arrow. In FIG. 2B one is able to identify the recess 31 of the flywheel 3 below the pendulum seal 5 as beginning to run through. The sealing strip 11 of the compressor rotary piston 1 with the s cling toggle strip seal 4 is ready to dip into the recess 31 coming towards it. The, viewed in the direction of rotation, front side on the recess 31, was just still taking part in the compression and on the one hand is precisely sealed by the toggle sealing strip 4 against the housing and by the pendulum seal 5 against the flywheel 3. Laterally, thus on the face between the housing and the compressor rotary pistons, one or two ring seals made of bronze is/are provided for the adequate sealing. The sealing of the precisely fitted flywheel against the housing takes place by means of an oil film.

Figure 2C:
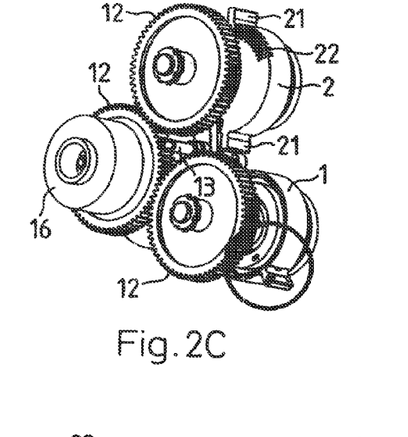
Figure 2D:
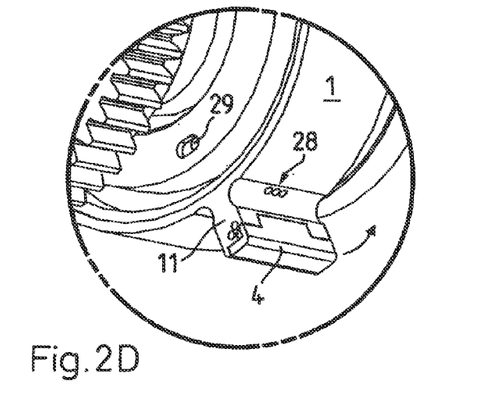

The toggle sealing strip 4, which, because movable, adapts itself smoothly to the chamber surface in the housing, is illustrated in FIG. 2D, visible in detail. For a better illustration, the engine in FIG. 2C is indicated turned around (gearwheels 12 forwards, previously backwards) and with a circle the section for FIG. 2D is indicated. The toggle sealing strip 4 mounted on the compressor sealing strip 11 is supported as able to swivel around an axis in such a manner, that it is capable of lifting off its seat, which is indicated by an arrow. Two small stops arranged in this example on the axis side left and right prevent a possibly too strong tilting when running through the recess 31 of the flywheel 3. At the neck of the compressor sealing strip 11 one is able to identify three approximately radial bores 28, the compressor bores (also refer to FIG. 3C). By means of these, the compressed mixture for ignition is conducted to a common transverse bore, the transfer bore 29 and from there through a bore in the housing directly introduced into the ignition chamber 7. This for one each respectively of a sealing strip per compressor rotary piston.

Figure 3A:
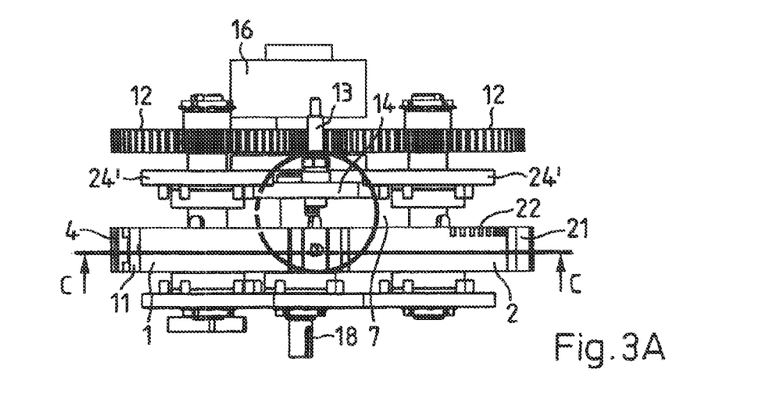
FIGS. 3A and 3B and 3C illustrate further details with a view into the ignition chamber.
Figure 3B:
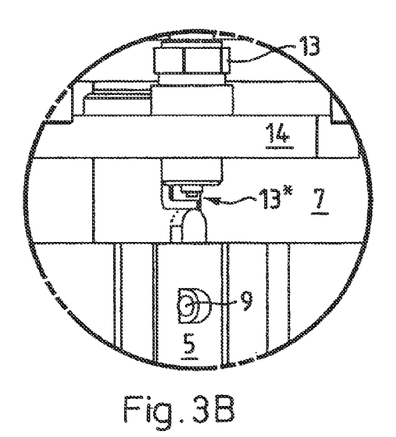

In the FIGS. 1 and 3A and 3B one identifies a receiving aperture, resp., bore 9 on the pendulum seal 5 for an adjusting mechanism acting eccentrically on the pendulum seal 5 (not depicted in these figures, but in principle pin/helical spring/ adjusting screw), through which, for example, through a helical spring a pin elastically presses against the pendulum seal.

With an adjusting screw the pressure of the pendulum seal on the running surface of the flywheel is adjusted. This adjusting device is not depicted. Further details are still to be discussed further below.

Figure 3C:
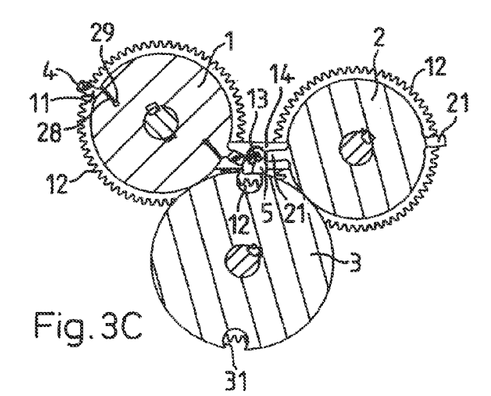

For the further overview the three FIGS. 3A and 3B and 3C serve. FIG. 3A is a view from above into the engine, FIG. 3B illustrates an enlarged detail from it and FIG. 3C illustrates a cross-section through the rotating components. In the detailed FIG. 3B one is able to identify an ignition plug 13, which with its electrodes 13* projects into the ignition chamber 7 formed in the housing. Serving for covering the ignition chamber 7 is a covering plate 14, which here simultaneously serves as a holder for the ignition plug 13. All other essential components, such as the here well visible pendulum seal 5, have already been discussed. The ignition chamber 7 is located in the housing, into which the compression ignition mixture is conducted in through a bore in the housing (depicted above) from the compression chamber and through a further bore in the housing the exploding gas is conducted out into the expansion chamber. This is depicted in detail in the cross-section in accordance with FIG. 3C. One is able to identify the gas inlet points shown in FIG. 2D, bores 28 on the compression strip and the gas transfer bore 29 situated transverse to it.

Here, an example for the design of the ignition chamber: In the discussed embodiment it comprises a height/width of 10×10 mm and a length of 60 mm, which corresponds to a volume of 6 cm$^3$. It is milled into the housing with an end milling cutter. The inlet bore into the ignition chamber comprises a diameter of 6 mm and the outlet bore into the expansion chamber also comprises a diameter of 6 mm. Both bores are built into the housing. In case of a compression of 10 bar, a gas volume of around 60 cm$^3$ is aspirated and compressed in the ignition chamber. Following the combustion and expansion this corresponds to a gas volume of approx. 240 cm$^3$. In the area of the inlet bore, a non-return valve is arranged or else in a recess in the combustion chamber above the inlet bore a one-way flutter valve, both not depicted, wherein during the ignition of the mixture the expanding gas at the moment of the aligned gas passages the expanding gas is not capable of passing into the clearance between the housing and the rotary piston and from there into the compression chamber. Housing 10 and rotary piston 1 in addition are sealed with, for example, one or two ring seals 8. These are precautions, in order to achieve a maximum compression.

Figures 4A, 4B, 4C, 4D, 5A, 5B:
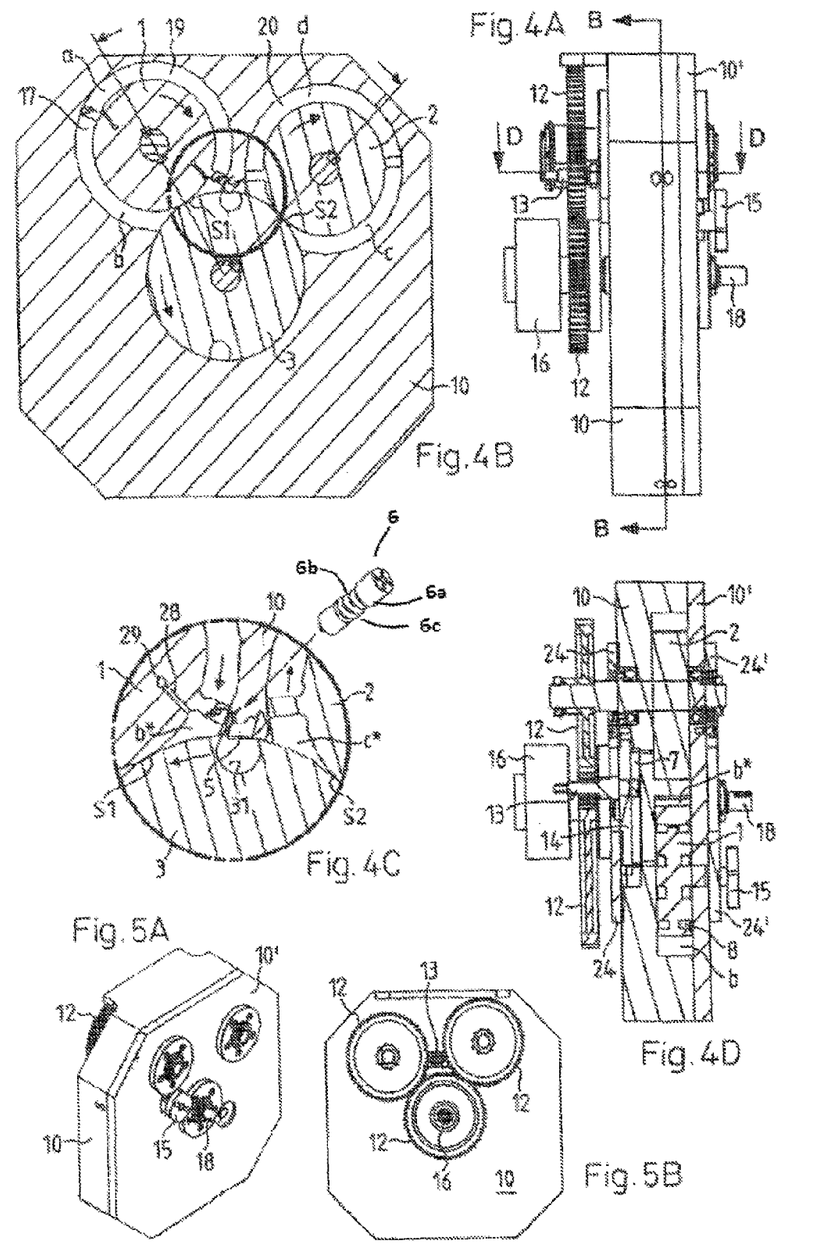
FIG. 4A illustrates the engine from the side.
FIGS. 4B and 4C are cross-sections through the engine and FIG. 4D illustrates a detail from a cross-section.
FIGS. 5A and 5B illustrate the engine of the first embodiment in the housing, once from the front FIG. 5A and once from the back FIG. 5B.

The FIGS. 4A and 4B and 4C now illustrate the engine in the housing. This comprises the housing 10 and the base plate 10', wherein now the internal components are covered and not visible anymore, which was the case in the preceding Figures. FIG. 4A illustrates the engine from the side; two cross-sections, one vertical and one horizontal are illustrated in the FIGS. 4B and 4D. FIG. 4C illustrates a detail from the cross-section of FIG. 4B.

Due to the presence of the housing, now also the circular ring-shaped chambers 19 for compression and for expansion 20 as well as for suction aspiration 17 are visible. The chambers for the purpose of explaining the function, further down are designated with a, b, b* and c, c*d, wherein the chambers b und b* are separated by a block S1 and the chambers c and c* by a block 82. One, furthermore, is able to see, how the pendulum seal 5 is arranged in the housing 10. It is drawn as so large that it just about has space in the housing, this in order to be able to depict details, as a rule, however, it is somewhat smaller in diameter. The pendulum seal in the illustrated embodiment is encompassed by the housing to such an extent, that it so-to-say 'floating' on an oil film is movable around its longitudinal axis, therefore does not require an axis for holding it. FIG. 4B furthermore illustrates an essential point in the arrangement of the axis, resp., shafts relative to one another. The enclosed angle between the axis of the flywheel 3 and the axes of the two working rotary pistons 1 and 2 here is smaller than 90 degrees, proving to be advantageous is an angle of between 70-80 degrees, for example, of 75 degrees. This angle determines the distance between the inlet—and outlet bores to and from the ignition chamber. This distance shall be small, however, by it also the size/length of the ignition chamber are determined. The angle also determines the forward movement of the sealing strip of the working rotary pistons.

FIG. 4C illustrates a part in connection with the previously discussed function of the pendulum seal 5. One is able to identify how it is arranged within the housing 10, namely, capable of rotating movement. The directions of rotation of the working rotary pistons and the flywheel are as already explained above, the flywheel recess 31 extends below the pendulum seal, in order receive the compressor sealing strip 11 with the toggle sealing strip 4. Into the bore 9 for the press-on device 6 an arrow is indicated, which is to show the press-on device 6, pin-spring-screw, onto the pendulum seal and how it is capable of turning the pendulum seal, resp., of pressing it on to the flywheel. This of course only by a tiny sealing angle to the flywheel in such a manner, that the oil film is not damaged or torn off. The press-on device 6 comprises a pin 6$a$ mountable in the receiving aperture being supported on a coil spring 6$b$. The coil spring 6$b$ is supported on an adjusting screw 6$c$. With reference also to FIG. 12E, the press-on device 6 is conducted to the pendulum seal 5 through the housing of the internal combustion engine and is adjustable by the adjusting screw 6$c$ and a corresponding screw thread 9$a$. On the compressor rotary piston one is able to identify the compressor bore 28 with the transfer bore 29, through which the compressed ignition mixture is transferred to the ignition chamber. Furthermore, indicated here are two blocks S1 and S2 between the working rotary pistons and the flywheel, which separate the lower chambers, b and c into chambers b/b* and c/c*. More about this further below.

FIG. 4D illustrates the horizontal cross-section of FIG. 4A. The cross section extends to slightly above the ignition plug 13, in order that a part of the ignition chamber 7 becomes visible. One is able to see how the base plate 10' with the bearing flanges 24' and the housing 10 with the bearing flanges 24, the bearing for the shafts of the working rotary pistons 1 and 2 and the shaft of the flywheel 3 are supported. Furthermore in cross-section through the compressor rotary piston 1 one is able to see the sealing grooves 8 for the front side seals between the pistons and the housing, which is made of, for example, bronze. One is also able to identify the chambers 19 for compression and 20 for expansion. The bearing support of the expansion rotary piston 2 is visible in this cross-section, for the compressor rotary piston the cross-section passes underneath the bearing support.

The FIGS. 5A and 5B illustrate the engine with the housing 10 and the cover plate 10' from the side with a flange 15 for a carburettor and from the other side with the gearing 12 for the positive synchronisation and the solely schematically indicated ignition device 16. Between the gear wheels 12 one is also able to see the seat for the ignition plug 13. This is in order that one is also able to see the external shape of the engine of this embodiment.

Figure 6A:
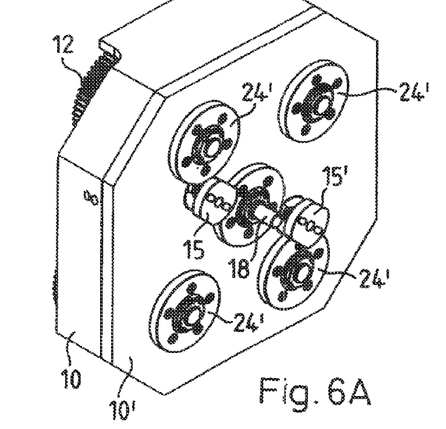
FIG. 6A illustrates the front side with the flanges for the carburettors and FIG. 6B the back side with gear wheels for the synchronisation of the working rotary pistons and of the flywheel.
Figure 6B:
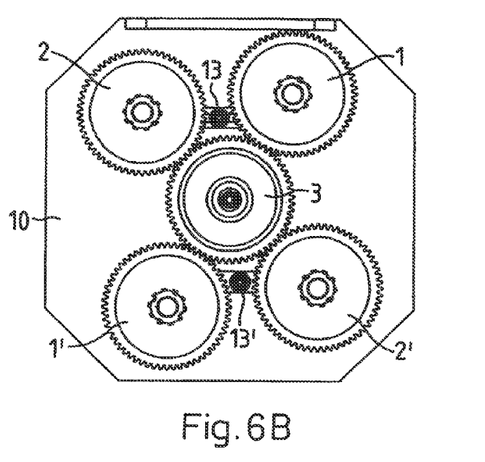
Figure 7A:
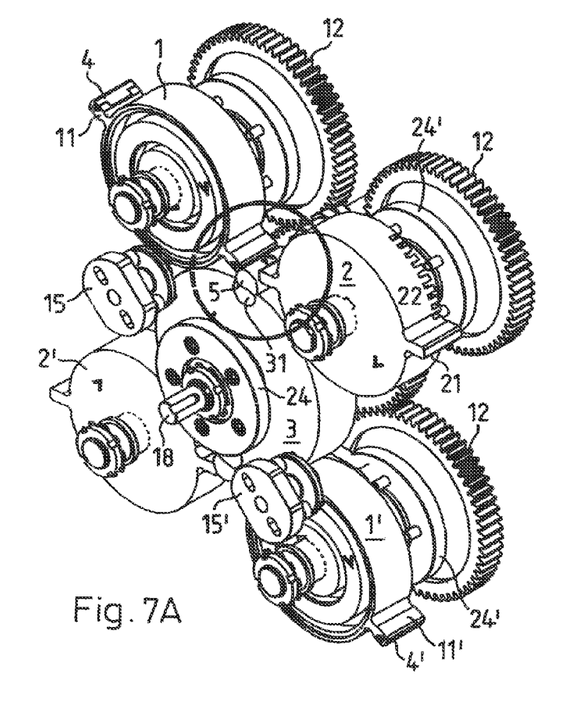

The FIGS. 6A and 6B now illustrate, similar to the FIGS. 5A and 5B, an embodiment in the housing, with, however, five axes, resp., shafts, in other words, an embodiment with four working rotary pistons, which act on the same flywheel. In FIG. 6A, one is able to identify the housing 10 with base plate 10', the flanges for the axes bearing supports 24', as well as a second flange 15' for the connection of a second carburettor. Furthermore, added behind the gearing in the housing (FIG. 6B), synchronised with the same flywheel 3, below a further compressor rotary piston 1', are a further expansion rotary piston 2' (of course behind the gear wheel in the housing), a second ignition chamber 7', a further ignition plug 13', in brief, a so-to-say doubling of the engine. FIG. 7A illustrates this without the housing. With this, instead of 2 ignitions as in case of the first embodiment indicated above, 4 ignitions per revolution result, in other words, four times the possible power yield of the engine. This as an overview of the second embodiment.

FIG. 7A illustrates, so-to-say arranged around the flywheel 3, one compressor rotary piston respectively 1 and 1', one expansion rotary piston respectively 2 und 2', as well as for each working unit a flange 15 and 15' for two carburettors. All other components have been discussed in essence with the help of the preceding Figures. In the indicated circle a section for the FIG. 7B has been taken out, which in FIG. 1 would have overloaded the drawing.

Figure 7B:
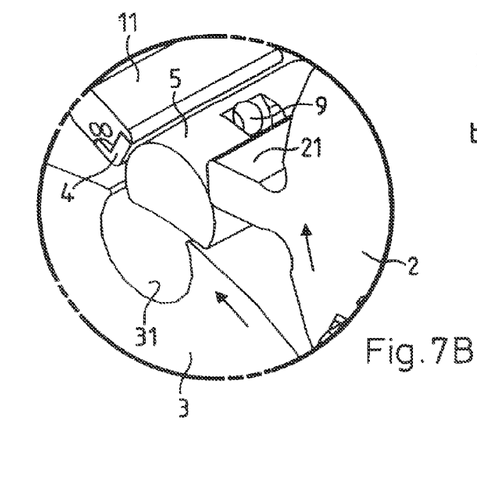
Figure 7C:
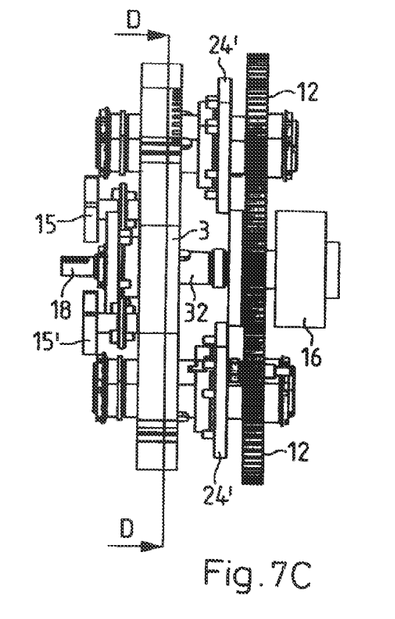
Figure 7D:
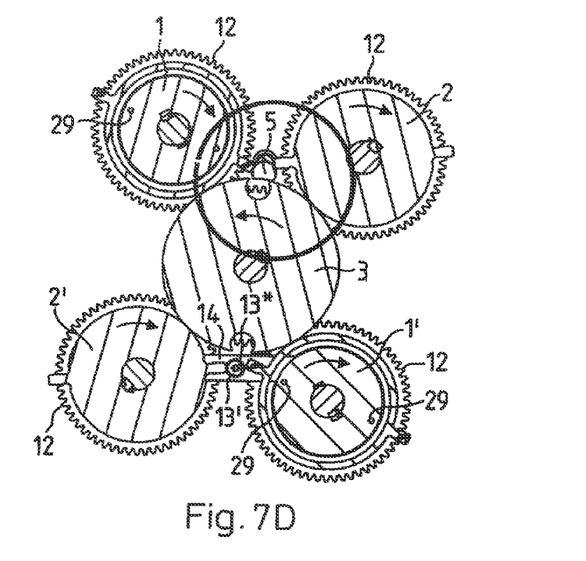
Figure 7E:
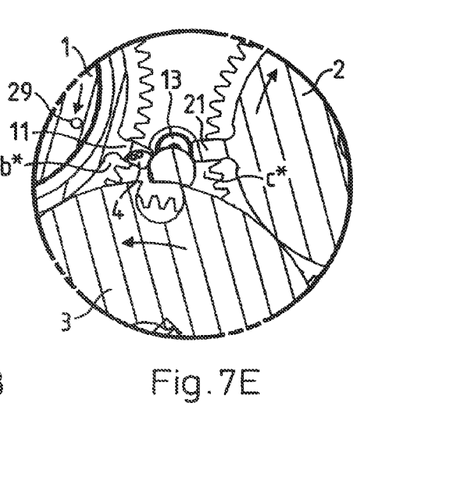

FIG. 7B now therefore illustrates a section of FIG. 7A. FIG. 7C illustrates the engine without housing from the side and FIG. 7D illustrates a cross-section through FIG. 7C. The essential details in FIG. 7C are the gear wheels 12 of the synchronisation gearing, the working rotary pistons, the flywheel 3 with its axis/shaft 32, to which the shaft 18 connects for the power transfer. The two carburettor flanges 14 are visible on the left side. FIG. 7E illustrates a section with details from the cross-section (without housing) in accordance with FIG. 7D. The cross-section is in such a manner, that one through the ignition chamber not visible because of the missing housing, is able to see the contacts 13*  of the ignition plug 13, which is screwed into the holding plate 14. On the side of the added two working units 1' and 2' (in FIG. 7D below) the pendulum seal 5 has been omitted, in order to have a free view onto the contacts of the ignition plug 13' and their contact 13*. On the compressor rotary pistons 1 and 1' one is able to see the bores 29 for the transfer of the compressed ignition mixture into the ignition chamber 7. In detail, this is also indicated in FIG. 7E in the up until now discussed position of the working rotary pistons at the end of the compression in the chamber b*, shortly before the explosion, resp., shortly before the expansion in the chamber c*. In the background, one is able to see the ignition plug 13. Of course, for the added working rotary pistons the same prerequisites with respect to the geometries between axes and to the flywheel 3 apply as in the case of the first embodiment, namely an angle of less than 90 degrees.

Figure 8A:
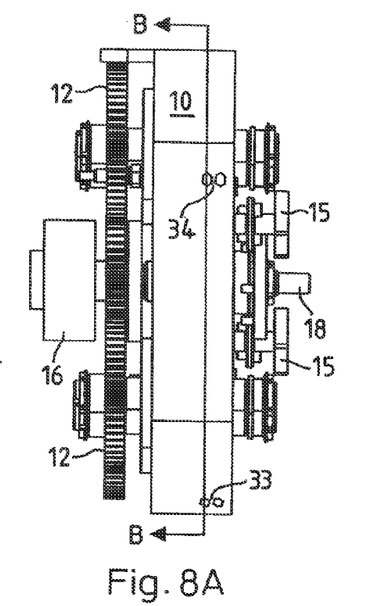
FIG. 8A illustrates the engine from the side.
Figure 8B:
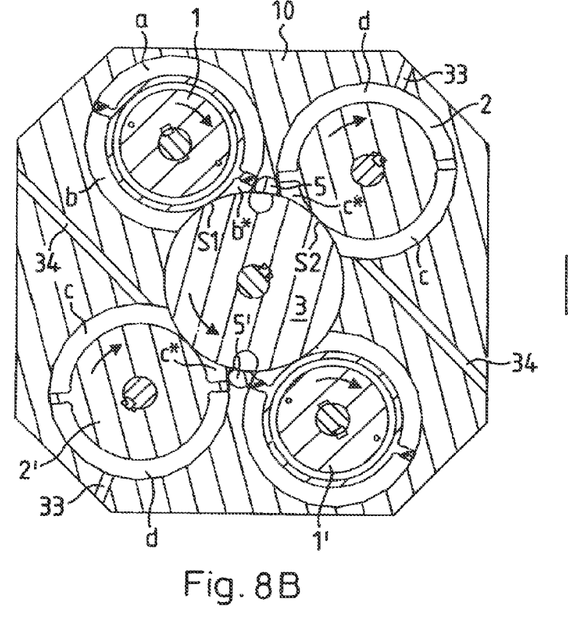
FIG. 8B illustrates a cross-section from it.

FIG. 8A illustrates the engine from the side and a cross-section in accordance with FIG. 8B through the engine in the housing 10 without base plate 10' and namely in such a manner, that it intersects the working rotary pistons 1, 2, 1', 2' and the exhaust gas channels 33 and 34. The arrows in FIG. 8B indicate the directions of rotation of the four working rotary pistons and of the flywheel. One is able to identify, once again, the positions of the compressor sealing strip 11, resp., expansion sealing strip 21 at the end of the compression and the beginning of the expansion. The sealing strips opposite one another by 180 degrees of each working rotary piston for respectively each of the working rotary pistons form two chambers, here a and b/b* on the compressor rotary pistons 1 and 1' and two chambers c/c* and d on the expansion rotary pistons 2 and 2'. The working rotary pistons rotate (in this depiction) clockwise and the flywheel counter-clockwise.

The chambers b* and b, through the contact of the expansion rotary pistons with the flywheel, are separated into a smaller part b* and into a larger part b. The contact point produces a block S1 sealed-off by an oil film between the two parts. The chambers c* and c through the contact of the expansion rotary pistons with the flywheel are also separated, into a smaller part c* and into a larger part c. The contact point produces a block S2 between the two parts. The partial circle-shaped chambers in this embodiment comprise a volume of around 80 cm$^3$. During the rotation this volume is compressed to approx. 10 cm$^3$ in the ignition chamber. Per revolution twice and at 10,000 rpm, these are not very fast turning rotary piston engines, but in the case of the mentioned speed of rotation, the aspiration-compression-ignition-expansion takes place around 167 times per second for two Otto engine ignition sequences, in other words, one ignition sequence each respectively within around 3 milliseconds.

In the chambers a, the compression begins (when one starts to rotate after the ignition of the gas mixture), the chambers begin to aspirate. The chamber c* experiences expansion and from the chambers d and c the combusted ignition mixture is exhausted through the exhaust gas channels 33 and 34. The chambers c* and c through the contact of the expansion rotary pistons with the flywheel are separated into two parts, into a smaller one c* and into a larger part c. The contact point, as mentioned, produces a block between the two parts. The smaller part c* is connected with the outlet bore of the ignition chamber and is subjected to the expansion pressure. The larger chamber c still contains expanded combustion gas, which, however, would be compressed at the block. In order to prevent this, the outlet 33 is provided. It has to be observed, that the designation of the chambers is only a temporary one, as in the case of a snapshot.

The position of the rotary pistons indicates the approximate moment of the ignition and expansion. The sealing strip 11 with the toggle sealing strip 4 on the compressor rotary piston 1 and 1' has pushed the compressed ignition mixture through a, for example, one-way flutter valve (not indicated) into the ignition chamber and now dips into the recess 31 in the flywheel 3. The one-way flutter valve, comprises, for example, a springy steel plate arranged above the inlet aperture into the ignition chamber, for example, as it is utilised in 2-stroke engines. The expansion sealing strip 21 on the expansion rotary pistons 2 and 2' now have just emerged from the recess in the flywheel and are ready to be driven upwards (resp., downwards) by the expansion through the exploding ignition mixture. The chamber above the sealing strip begins to exhaust combusted gas through the short exhaust gas channel 33, this also in the chamber c below the second sealing strip, where the expanded smoke is exhausted through the long exhaust gas channel 34. The two small chambers b* at the end of the compression and the beginning of the expansion c* have to be extremely well sealed against one another, in order that the compressed gas (here through the paper plane) is pressed into the ignition chamber and that after ignition has taken place the expansion does not spread into the compression chamber. Serving this purpose is the pendulum seal 5, which by the adjustment device 6, for example, depicted in FIG. 4C is adequately pressed on to the flywheel. The toggle sealing strip 4 takes care of an optimum compression, the pendulum seal 5 prevents the transfer between the compression- and the expansion part. On the expansion side a measure of this kind is not necessary, because the expansion losses in case of the rapidly increasing volume are unimportant. In contrast, a volume loss in case of the relatively low volume in the compression part is significant.

Figure 8C:
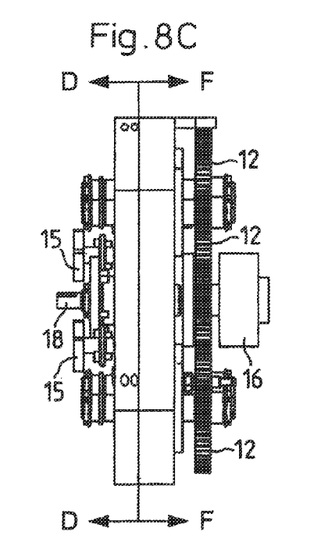
FIG. 8C illustrates a cross-section with a view in both directions, FIG. 8D and FIG. 8F. A detail each from the cross-sections is illustrated in the FIGS. 8E and 8G.

FIG. 8C illustrates the engine from the side with a cross-section, which once extends in direction D to the carburettor flange and once in direction F to the synchronisation gearing. In correspondence with reversal of the direction of viewing, of course also a reversal of the direction of rotation of the working rotary pistons takes place. The FIG. 8D and the detailed FIG. 8E illustrate details in the direction to the carburettor flange and the FIG. 8F and the detailed FIG. 8G illustrate details in the direction of the synchronisation gearing. In FIG. 8C, on one side one is able to identify the two carburettor flanges 15 and the shaft 18 for the power transfer from the flywheel and on the other side one is able to identify the synchronisation gearing 12 and the electric ignition device 16.

Figure 8D:
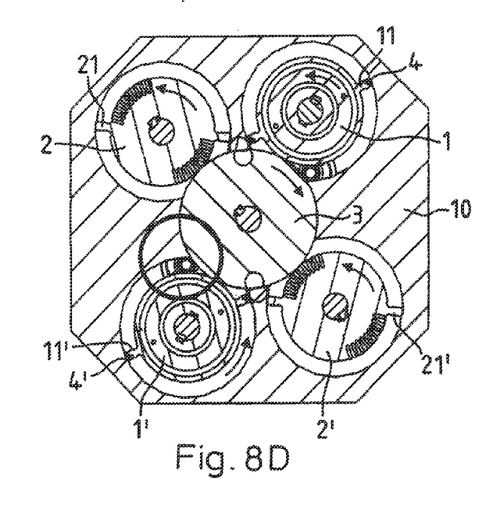
Figure 8E:
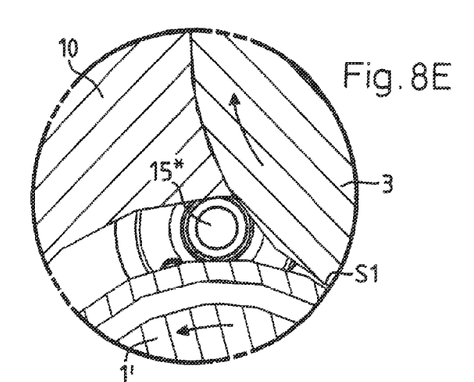

FIGS. 8D and 8E illustrate the compression chambers of the compressor rotary pistons 1 and 1' in the proximity of the blocking point S1 with the flywheel 3 the inlet bore 15* of the ignition mixture from the carburettor for the compression in the one chamber, which now aspirates behind the block S1 (the sealing strips 11, 11' with the toggle sealing strips 4, 4' rotate counter-clockwise). The other chamber opposite has received the mixture for compression and begins to compress. As soon as the sealing strips 11, 11' in the vicinity of the flywheel recess 31 dip into it and turn away, on the one hand the compression starts and on the other hand the aspiration from the carburettor.

Figure 8F:
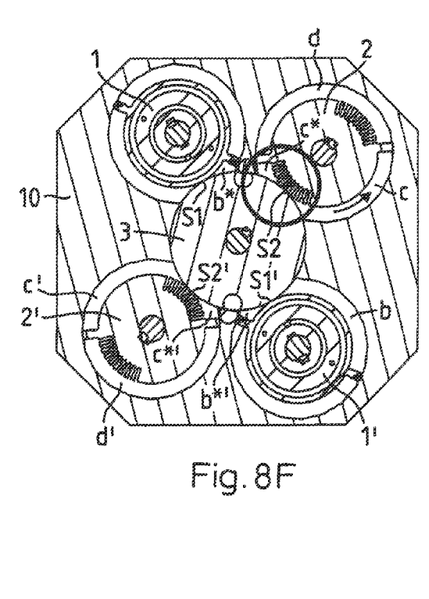
Figure 8G:
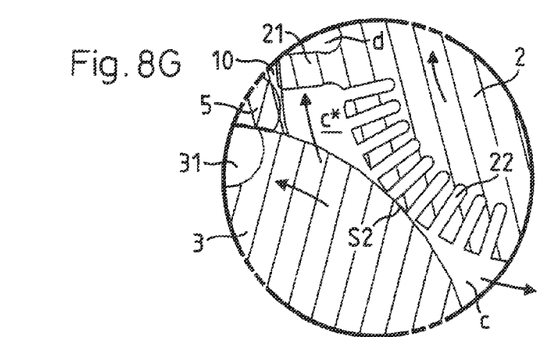

The FIGS. 8F and 8G in the same cross-sectional plane face against the gearing. FIG. 8F illustrates in particular the blocks S1, S2, S1', and S2' from the flywheel to the working rotary pistons for the forming of the compression- and expansion chambers. It has to be mentioned here, that this design of an engine solely in this form is entirely novel. Because now the expansion (that is the explosion of the ignition mixture) provides a significantly greater gas volume than the compressed volume (40-50 times more) and because this greater gas volume has to be rapidly conducted into the exhaust gas chamber, the expansion rotary piston 2, conceding a minimum expansion pressure loss, for example, comprises additional outlet grooves 22, which somewhat increase the initial expansion volume c* to the later exhaust gas chamber. These outlet grooves 22, as in previously discussed Figures, are only located laterally on the expansion rotary piston and at the block S2 between the smaller c* and the larger chamber c produce a certain, but negligible expansion pressure loss in the direction of the larger chamber. In the FIG. 8G on the left-hand top edge one is also able to see well, how the expansion sealing strip 21 has 'emerged' from the flywheel recess 3 and that the recess now passes below the pendulum seal 5.

Figure 9A:
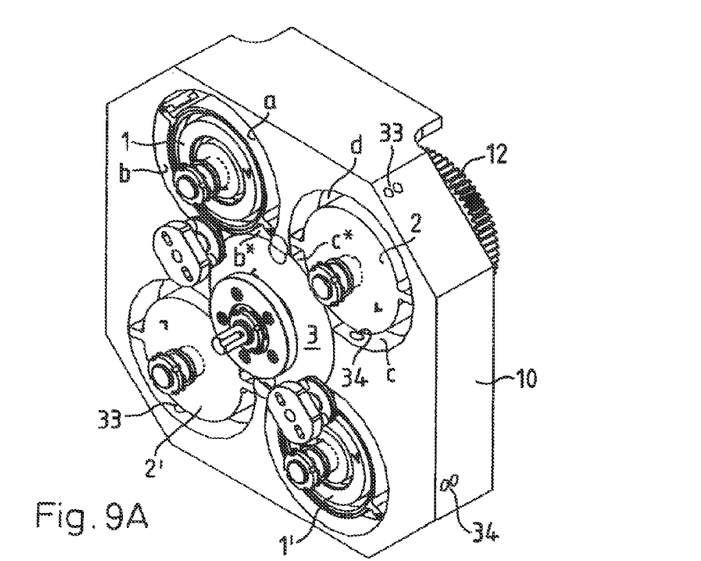
FIG. 9A illustrates the working rotary pistons embedded in the housing, but without a cover plate, on which the carburettor flanges are mounted.
Figure 9B:
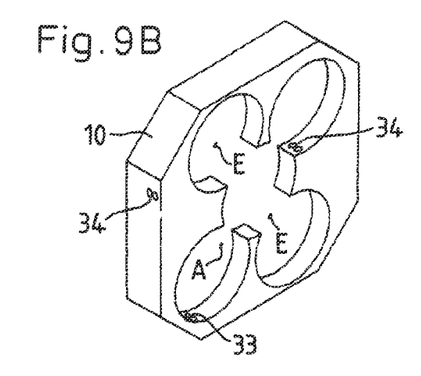
FIG. 9B illustrates the housing without a cover plate and without engine components.
Figure 9C:
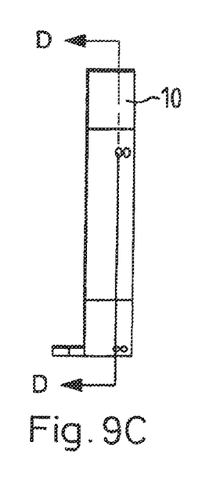
FIG. 9C illustrates a cross-section through the housing, namely in the plane through one of the gas exhaust apertures (FIG. 9D)
Figure 9D:
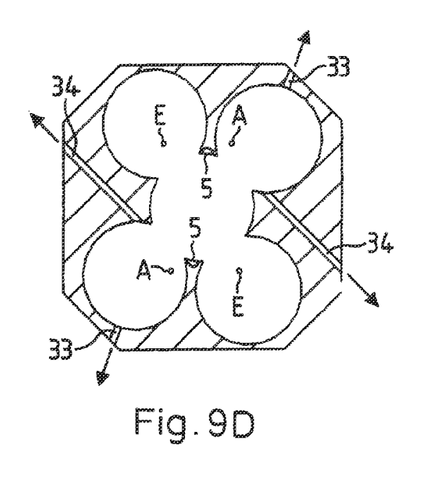
Figure 9E:
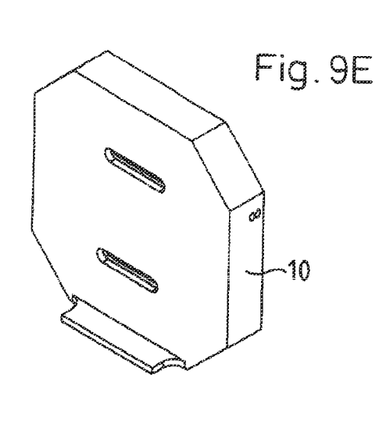
FIGS. 9F and 9E illustrate the back side of the housing (side of the gear wheels), and a somewhat slanted cross-section through the housing according to FIG. 9F is illustrated in FIG. 9G, in which the ignition chamber and a gas passage point are visible.
Figure 9F:
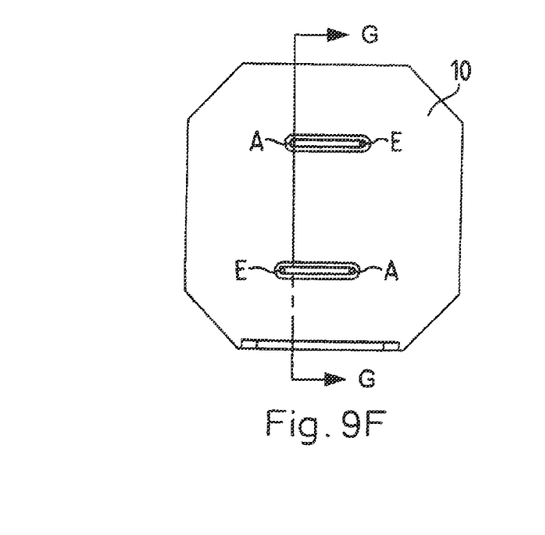
Figure 9G:
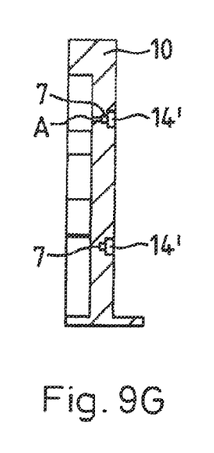

Serving for the illustration of the engine housing alone are the FIG. 9A still with engine components, 9B, 9C and 9D for more of the front side and the FIGS. 9E, 9F and 9G for more of the rear side. Thus, FIG. 9A depicts the five rotating elements embedded in the housing 10 without the base plate 10'. Once again those components are omitted, which have already been discussed and which do not contribute to the explanation. Clockwise from above left one is able to identify the first compressor rotary piston 1 and above right the first expansion rotary piston 2. Below right one is able to see the second compressor rotary piston 1' and below left finally the second expansion rotary piston 2'. All four working rotary pistons act on the flywheel 3 arranged in the centre. Well visible here are the discussed chambers, which by the base plate 10' are finally closed-off to form a tightly sealed chamber. Furthermore one is able to identify by the position of the aspiration chambers b and b' of the compressor rotary pistons 1 and 1' the carburettor flanges 15 and 15'. Finally one sees outside on the housing the outlet of the short-33 and long 34 exhaust gas channels.

FIG. 9B now depicts the "empty" housing. On the inside partially covered one is able to identify the bores E for the inlet to and A for the outlet to and from the ignition chamber, as well as the bores for discharging the combusted gases, which in FIG. 9C, resp., 9D are depicted in cross-section. These bores do not directly lead into the corresponding chambers, they are connected with the chambers through bores in the compressor rotary pistons, the transfer bore 29 and the compressor bore 28. FIG. 9E illustrates the slit-shaped, angled (stepped) recesses arranged on the rear side of the housing, the smaller one for the ignition chamber 7 and above it the larger one 14' for the cover 14 of the ignition chamber 7, which simultaneously serves a holder 14 for the ignition plug 13. This has already been shown in earlier Figures. On the rear side of the ignition chamber in FIG. 9F one is able to identify the outlet bore A from the expansion chamber c* out of the ignition chamber 7, which in the cross-section in accordance with FIG. 9G is well visible. In this Figure above one identifies the ignition chamber 7 with the recess for the cover plate 14 and with the outlet bore A to the expansion chamber and below one only sees the ignition chamber 7 with the cover plate 14 because of the somewhat slanting cross-section past the inlet bore E. The ignition chamber in comparison with the size of the engine of course appears very small. The FIG. 9D, a cross-section in the plane of the exhaust gas channels of FIG. 9C, depicts these and the inlets for the ignition mixture and the outlets for the combustion gases to and from the ignition chambers as well as the recesses for the pendulum seals 5, to such an extent as these are utilised in case of the first two embodiments.

Figures 10A, 10B, 10C:
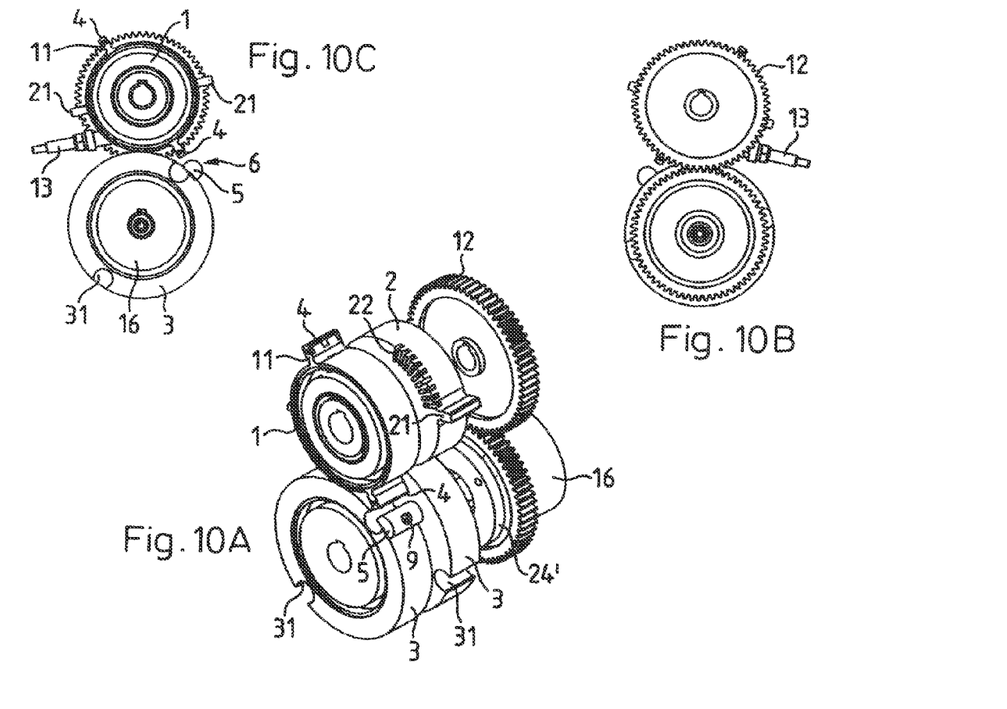

A further embodiment is illustrated in the FIGS. 10A, 10B and 10C. FIG. 10A illustrates an isometric view of the engine without housing. From front to rear, one is able to identify the compressor rotary piston 1 with the compressor strips 11 and the toggle seal strips 4 arranged on it, underneath a first flywheel 3 with the recesses 31 and the (arranged in the housing) pendulum seal 5 with the recess or bore 9 for the pin of the already discussed press-on device 6. The flange 15 for the carburettor here on the not depicted housing is located above a bore, which leads into the compression chamber b*, which is indicated in a later Figure. Behind it at the distance of the housing one is able to identify the expansion rotary piston 2 with the outlet grooves 22 and the second flywheel 3 interacting with it 3. Behind this, one is able to identify the gear wheels 12 for the synchronisation gearing and in the axis line one still sees a part of the schematically illustrated electric ignition device 16. The working principle in the case of this embodiment essentially is the same as already described above. This embodiment further below is once again presented on the basis of cross-sectional Figures.

The FIGS. 10B and 10C illustrate the engine in front—and in rear view. In these two Figures one sees the position of the ignition plug 13 and above all also the position of the pendulum seal 5 arranged in the housing. An arrow pointing past the centre of rotation at the pendulum seal indicates, how this seal by means of the press-on device 6 depending on the tension of the screw spring is (slightly) pressed against the flywheel. In both Figures, one here identifies a 90 degree lead relative to the sealing strips 11 and 21 of one working rotary piston 1 to the other working rotary piston 2 (looks like a cross). In contrast to this, the preceding embodiments have a lead angle of less than 90 degrees (in the example 75 degrees). One furthermore on the compressor rotary piston 1 is able to see grooves for a ring seal for sealing on that part of the housing, which is not depicted here. Right in the background, one is able to identify the synchronisation gearing with the gear wheels 12. The ignition chamber 7 is located in the housing incorporated between the two working rotary pistons 1 and 2.

Figure 11A:
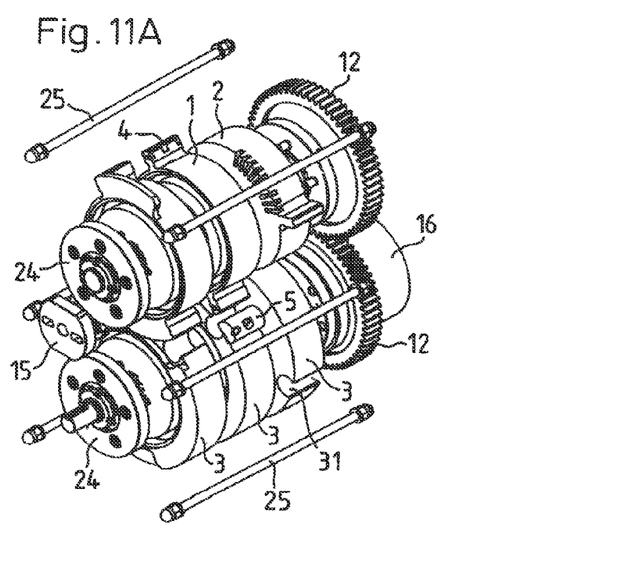
FIGS. 11A and 11B illustrate the third embodiment with an additional pair of rotary pistons, namely FIG. 11A an isometric view and FIG. 11B a view from above into the ignition chamber.
Figure 11B:
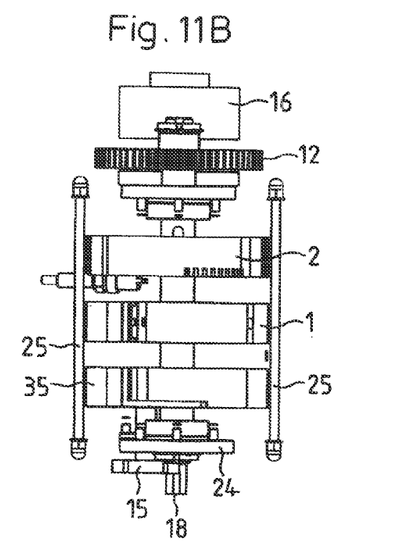

A further embodiment is illustrated in the FIGS. 11A and 11B. FIG. 11A illustrates an isometric view of the engine without housing, but for illustration of the housing circumference with the flange screws 25 holding the housing parts together. The working rotary pistons here as in the previously described embodiment each respectively comprise an assigned flywheel; in addition, this embodiment for the aspiration of the combustion mixture comprises an additional working rotary piston 35, which also works together with an own (third) flywheel. The lead of the sealing strips 11 and 21 of the compressor—and expansion rotary pistons 1 and 2 amounts to the same 90 degrees, while the sealing strips of the aspiration rotary piston 35 do not comprise any lead to the sealing strips 11 of the compressor rotary piston 1. With this additional working step it is possible to achieve a certain pre-compression, in order to increase the compression effect in the compression step. In case of fast running engines this has an additional effect with respect to the overall compression. On principle it is possible to arrange an aspiration step of this also in case of all embodiments discussed above.

FIG. 11B illustrates a view from above into the engine. One is able to identify the pair of compressor rotary pistons 1 and expansion rotary pistons 2 with the ignition chamber located in between, which is not capable of being depicted without the housing (in the case of the first three embodiments the ignition chamber is located at the side of the working rotary pistons). However, one is able to identify their position by the position of the ignition plug contacts. The details on and between the two working rotary pistons in the housing are depicted in the following Figures.

Figure 12A:
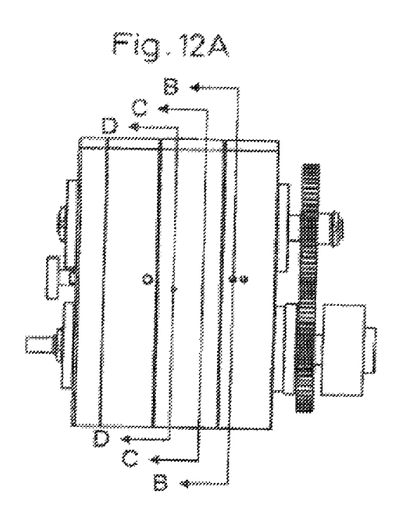
FIG. 12A illustrates the engine from the side, FIGS. 12 B, C and D each respectively a cross-section and FIG. 12E a detail from the cross-section of FIG. 12D.
Figure 12B:
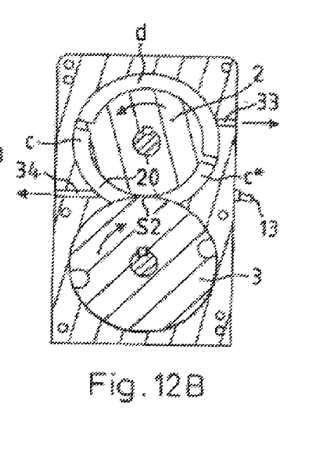
Figures 12C, 12D:
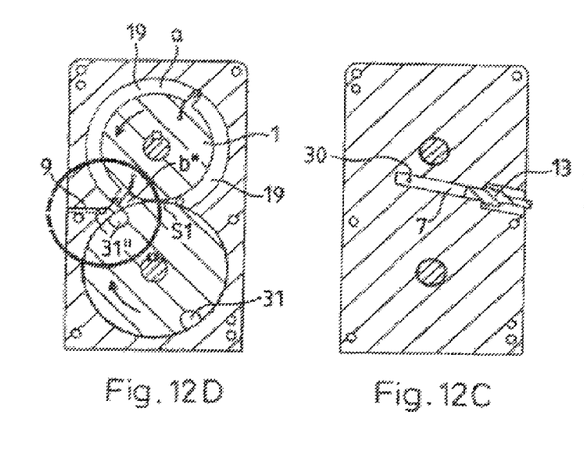
Figure 12E:
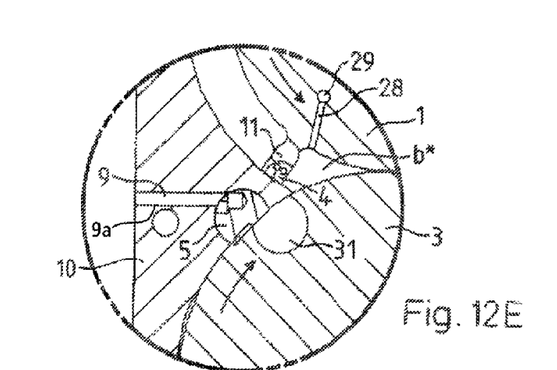

The FIGS. 12A, 12B, 12C, 12D and 12E illustrate various sections through the two last embodiments, this signifies, through the compressor part with the compressor rotary piston 1 and through the expansion part with the expansion rotary piston 2 and through the ignition chamber 7. FIG. 12A illustrates the engine from the side and indicates the position of the three cross-sections A, F and E. Cross-section D refers to FIG. 12D. From this Figure a section is also depicted in FIG. 12E.

FIG. 12B illustrates the cross-section through the expansion rotary piston 2 in such a manner, that in the housing the outlets for the combusted exhaust gas become visible. Because the expansion (that is the explosion) produces a significantly greater quantity of gas than the compressed volume and this greater gas quantity has to be conducted into the exhaust gas chamber as rapidly as possible, the expansion rotary piston comprises the additional outlet grooves 22 (of the preceding Figure), which increase the volume of the exhaust gas chamber. The blocking point S2 between the expansion rotary piston 2 and the flywheel 3 separates the expansion chamber 20 into the larger chamber c and the smaller chamber c*, which also is to be viewed solely as a snapshot. Visible on the right side is also a part of the ignition plug 13.

FIG. 12C illustrates the cross-section through the housing in a plane, which intersects the ignition chamber, therefore between the compressor rotary piston 1 and the expansion rotary piston 2. Apart from the ignition plug 13, in the cross-section in the ignition chamber 7, one is also able to identify the inlet bore 30 for the ignition mixture, which by means of, for example, a non-return valve or a one-way flutter valve (not depicted) is closed-off against the compression chamber. If one draws a line from the outlet bore in FIG. 12C to the inlet bore in FIG. 12D, one is able to see, that these two bore parts are located on one line and exactly correspond. Not depicted is the outlet bore from the ignition chamber to the expansion chamber, which leads into the smaller expansion chamber c*.

FIG. 12 D illustrates the cross-section through the compressor rotary piston 1 in one plane in such a manner, that the bore for the press-on device 6 to the pendulum seal 5 becomes visible. Also, the compressor bore 28 becomes visible in the compressor rotary piston 1 and the transfer bore 29 in the hosing, through which the compressed, to be ignited gas mixture is conducted into the ignition chamber. These details are better visible in FIG. 12E. Here too one is able to identify, how the one compression chamber 19 is separated by the blocking point S1 between the compressor rotary piston 1 and the flywheel 3 into a smaller chamber b* and a larger chamber b. In FIG. 12E, one is able to see the situation at the end of the compression discussed several times above. The ignition mixture during the compression phase has been pressed from the compression chamber b* through the compression bores 28 (in this example there are also three of these) in the compressor rotary piston 1 into the transfer bore 29 to the ignition chamber. Furthermore, one is able to see the bore 9 for receiving the press-on device 6 onto the rotatable pendulum bore 5, which presses it de-centrally and sealing onto the flywheel. The as loss-free as possible sealing of the compression is assured by the toggle sealing strips 4 arranged on the compressor sealing strips 11 and by the pendulum seal 5 pressed onto the flywheel.

In summary, an internal combustion engine in accordance with the invention comprises at least one compression chamber a, b/b* formed by a housing 10/10' and therein compressor rotary pistons 1, 1' rotating on a shaft with the toggle sealing strips 4 arranged on compressor sealing strips 11 in a gas connection with at least one ignition chamber 7 and through these in a gas connection at least one expansion chamber formed by the housing 10, 10' and therein expansion rotary pistons 2, 2' rotating on a shaft with expansion sealing strips, wherein an at least one flywheel 3 rotating in the housing 10, 10' on a shaft 18 provided for the power transfer with recesses 31 for receiving the compressor sealing strips and expansion sealing strips 11,21 of the rotary pistons together with the compressor rotary piston 1, 1' forms a compression chamber a, b, b* and with the expansion rotary piston 2, 2' an expansion chamber d, c, c* and in the housing part 10 a pendulum seal 5 with contact with the flywheel is arranged, and the ignition chamber 7 is equipped with a device for the ignition 13, 13*, 16 of a gas mixture in the ignition chamber compressed through the compression chamber.

The new construction of the internal combustion engine comprises a compression chamber a, b/b* formed by a housing 10/10', and on it compressor rotary pistons 1, 1' rotating on a first shaft with compressor sealing strips 11 in gas connection with at least one ignition chamber 7 and through this in gas connection an expansion chamber d, c, c* formed by the housing 10, 10' and therein rotating on a second shaft expansion rotary pistons 2 with expansion sealing strips 21, wherein a rotating flywheel 3 in the housing 10, 10' on a third shaft 18 provided for the power transfer with recesses 31 for receiving the sealing strips 11, 21 of the rotary pistons together with the compressor rotary piston 1 through a first block S1 forms compression chambers a, b, b* and with the expansion rotary piston 2 through a second block S2 forms expansion chambers d, c, c* and the ignition chamber 7 is equipped with a device for the ignition 13, 13*, 16 of a gas mixture in the ignition chamber compressed through the compression chamber, wherein the working rotary pistons 1 and 2, and the flywheel 3 each respectively comprise an own axis/shaft 26, 27 and 32.

Still capable of being assigned to this new arrangement are a pair of working rotary pistons each respectively with an own axis/shaft, which act on the same flywheel.

In case of the new construction of the engine, irrespective of which embodiment, it is immediately evident, that this engine essentially runs on oil films and that the continuous oil supply is minimal (drop by drop), because it is built in such a manner, that the oil film also has a sealing effect and as a result of this is extremely thin. It is therefore not comparable with the conventional construction, in particular with respect to piston engines, although the aspiration-ignition-expansion sequence is the same.

LIST OF DESIGNATION NUMBERS

1 Compressor rotary piston
2 Expansion rotary piston
3 Flywheel with blocking effect to the rotary pistons
4 Toggle sealing strip
5 Pendulum seal
6 Press-on device for pendulum seal
7 Ignition chamber
8 Sealing grooves on the front side of the compressor rotary piston
9 Bore for the press-on device for the pendulum seal
10 Housing, base plate 10' (together the housing)
11 Compressor sealing strip
12 Gearing (synchronisation) of the working rotary pistons
13 ignition plug
14 Cover of the ignition chamber/seat for ignition plug
15 Flange for carburettor, 15' inlet for the ignition mixture
16 Electric ignition device (for ignition plug)
17 Aspiration chamber
18 Shaft for power transfer from the flywheel
19 Compressor—or compression chamber
20 Expansion chamber
21 Expansion sealing strip
22 Outlet grooves on the expansion rotary piston
23 Receiving aperture on the pendulum seal
24 Flange on the base plate 10'
25 Flange screws
26 Axis/shaft for compressor rotary piston
27 Axis/shaft for expansion rotary piston
28 Compressor bore
29 Transfer bore
30 Inlet bore into the ignition chamber
31 Flywheel sealing strip receptacle, flywheel recess
32 Axis/shaft for flywheel
33 Exhaust gas channels, short
34 Exhaust gas channels, long
a Aspiration chamber
b Compression chambers b* and b
c Expansion chambers c* and c
d Expansion chamber
E Inlet for the ignition mixture
A Exhaust for the combustion gas
S1 Block on the compressor rotary piston
S2 Block on the expansion rotary piston

The invention claimed is:

1. An internal combustion engine, comprising:
   at least one inlet for an ignition mixture;
   at least one outlet for exhaust gas;
   at least one working chamber formed by a housing and a rotary working piston rotating therein and having at least one sealing strip;
   at least one flywheel rotating in the housing provided with at least one recess for receiving the sealing strip of the rotary working piston; and
   a pendulum seal arranged in the housing in contact with the flywheel and movable between the housing and the flywheel;
   wherein the pendulum seal comprises a receiving aperture mounting a press-on device; and
   wherein the press-on device comprises a bolt mountable pin mounted in the receiving aperture being supported on a coil spring and wherein the coil spring is supported on an adjusting screw.

2. The internal combustion engine according to claim 1, wherein the housing comprises a recess for receiving the pendulum seal such that the pendulum seal is movable in said recess.

3. The internal combustion engine according to claim 2, wherein the pendulum seal is rotatable in the recess around a longitudinal axis of the pendulum seal.

4. The internal combustion engine according to claim 2, wherein the pendulum seal is float-mounted on an oil film in the recess.

5. The internal combustion engine according to claim 1, wherein the receiving aperture is arranged eccentrically to a longitudinal axis of the pendulum seal, so that the press-on device exerts a rotary movement on the pendulum seal in case of pressure.

6. The internal combustion engine according to claim 5, wherein:
   the press-on device is conducted to the pendulum seal through the housing of the internal combustion engine and is adjustable by the adjusting screw and a corresponding screw thread.

* * * * *